United States Patent [19]

Prechtel

[11] Patent Number: 4,505,347
[45] Date of Patent: Mar. 19, 1985

[54] HEAVY-DUTY VEHICLE SYSTEM
[75] Inventor: Georg Prechtel, Pfedelbach, Fed. Rep. of Germany
[73] Assignee: Willy Scheuerle Fahrzeugfabrik GmbH & Co., Pfedelbach, Fed. Rep. of Germany
[21] Appl. No.: 427,273
[22] Filed: Sep. 29, 1982
[30] Foreign Application Priority Data
Nov. 4, 1981 [DE] Fed. Rep. of Germany ....... 3143723
[51] Int. Cl.³ .................... B62D 53/00; B62D 59/04; B60K 41/00
[52] U.S. Cl. ................................ 180/14.2; 180/14.6
[58] Field of Search .................. 180/14.6, 14.1, 14.4, 180/14.2, 14.3; 280/432

[56] References Cited

U.S. PATENT DOCUMENTS

| | | | |
|---|---|---|---|
| 2,872,992 | 2/1959 | Schirmer | 180/14.1 |
| 2,922,481 | 1/1960 | Hutter et al. | 180/14.6 |
| 3,035,653 | 5/1962 | Steepe | 180/14.2 |
| 3,299,980 | 1/1967 | Haefner | 180/14.7 |
| 3,578,096 | 5/1971 | Pearson | 180/14.6 |

FOREIGN PATENT DOCUMENTS

| | | | |
|---|---|---|---|
| 770980 | 11/1967 | Canada | 180/14.1 |
| 841850 | 6/1952 | Fed. Rep. of Germany . | |
| 1066875 | 10/1959 | Fed. Rep. of Germany | 180/14.6 |
| 1964708 | 12/1970 | Fed. Rep. of Germany | 180/14.6 |
| 2919831 | 11/1980 | Fed. Rep. of Germany | 280/432 |

Primary Examiner—John A. Pekar
Attorney, Agent, or Firm—Michael J. Striker

[57] ABSTRACT

A heavy-duty vehicle system has a driving vehicle having a main drive, at least one driven vehicle having an additional drive, a sensing element arranged to sense road conditions, and a self-acting automatic control element connected with the sensing element and arranged to control the additional drive of the driven vehicle in correspondence with the driving vehicle and in dependence upon the road conditions sensed by the sensing element.

31 Claims, 4 Drawing Figures

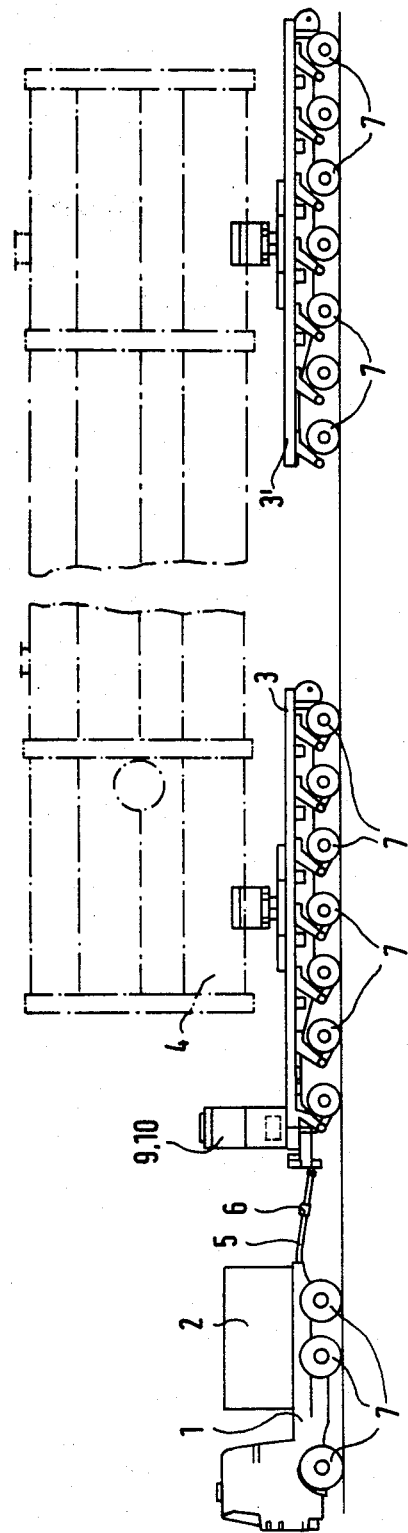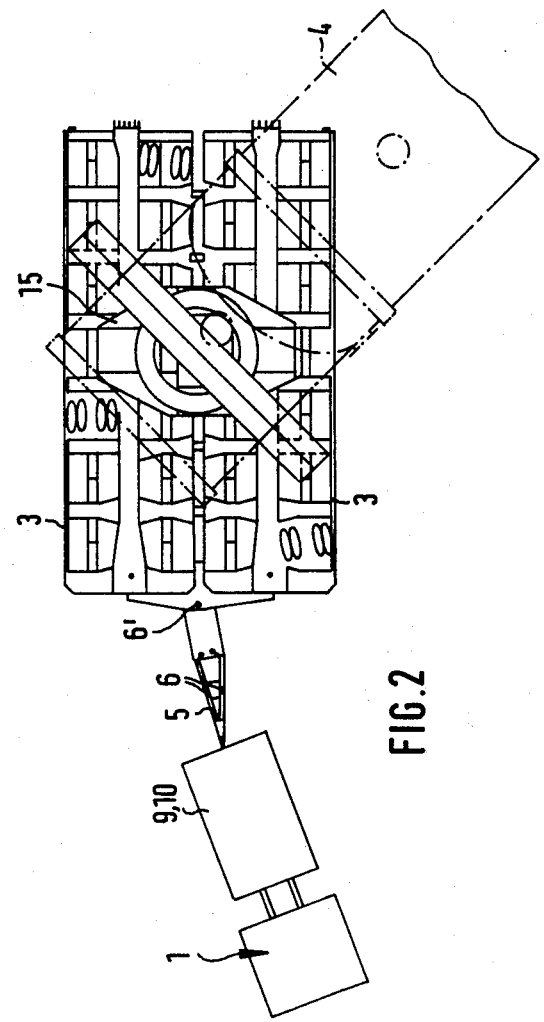

HEAVY-DUTY VEHICLE SYSTEM

BACKGROUND OF THE INVENTION

The present invention relates to a heavy-duty vehicle combination or a heavy-duty vehicles compound, such as for example tractors train, trailer power vehicles, trailer train or platforms train, particularly with turnable flat bed or platform vehicles supported by a plurality of axles or wheel groups and with at least partially driven axles or wheel groups by an additional drive on the load carrying vehicles.

Heavy-duty vehicle systems of the above mentioned general type are known in the art. With heavy loads, particularly loads which must be transported with consideration of special regulations or particular permission on street vehicles, it is in general not effective to transport the working load exclusively on pulled or pushed vehicles, trailers, etc., inasmuch as a tractor or a pushing vehicle which is the only driven vehicle in system must be loaded with high ballast weight in order to guarantee traction and friction loads required for movement of the vehicle combination.

The German patent 841,850 discloses trailer vehicles whose wheels are driven hydraulically by a motor unit arranged on a tractor, which in accordance with the power requirements can be turned on individually or in a parallel operation. In this construction it is not possible to change the ratio of the drive power supplied to the individual vehicles of the vehicle compound.

SUMMARY OF THE INVENTION

Accordingly it is an object of the present invention to provide a heavy-duty vehicle system which avoids the disadvantages of the prior art.

More particularly, it is an object of the present invention to provide a heavy-duty vehicle system (a vehicle combination or a vehicle compound) which makes possible very flexible power distribution without making yet more difficult the difficult operation by the vehicle driver of the vehicle combination or the vehicle compound.

In keeping with these objects, and with others which will become apparent hereinafter, one feature of the present inventions resides, briefly stated, in a heavy-duty vehicle system which has an additional drive of one or several vehicles, is controlled by a self-acting automatic control device in dependence on road conditions and/or travel situations which are sensed by sensors coupled with the control device, in correspondence with the leading vehicle or tractor of the vehicle combination or compound.

The vehicle driver need now to concentrate exclusively on the proper steering of the vehicle combination and the confident operation of the leading vehicle or the tractor. The respective individual changes of the drive power supplied to various vehicles are performed automatically.

The self-acting control of the power supply to the individual vehicles is especially effective when a part of the vehicles carrying the load, particularly those provided with hydraulic or electric individual wheel or axle drives, are driven by a separate motor unit which is independent of the motor of the tractor or the leading vehicle. This motor unit can be formed as a separate drive unit, particularly a diesel-generator unit or diesel-hydropump unit which can be coupled with different vehicles or separated from the respective vehicle.

During transport of heavy loads, for example for transporting ship hulls, bridge parts, heavy rockets, etc., the vehicle compound can be assembled from available or standardized vehicles and drive units, and for example the working load can be supported at its front and rear ends respectively via supporting bridges uniformly on two or more flat bed vehicles coupled parallel to one another. The vehicle arranged at the front end of the working load is connected exclusively via the working load with the vehicle arranged at the rear end, so that a distance is established between the forwardly moving and rearwardly moving vehicle groups.

The invention makes possible an individual assembling of a vehicle composition of in principle any number of vehicles with motors working completely independently from one another, inasmuch as the power distribution of the additional drive and the correct distribution of the power on the individual vehicles take place automatically.

Advantageously, the control device is adjustable to different input data which are sensed with the aid of different in some cases sensors, so that the additional drive is possible in dependence upon the different and particularly a plurality of parameters.

The control device can, for example, control the additional drive in dependence upon the momentary power of the drive unit of the tractor or leading vehicle. The power of the additional drive can depend in non-linear mode from the power of the tractor or the leading vehicle. It is for example possible that the additional drive only be noticeably utilized for driving the vehicle combination when the motor of the tractor or the leading vehicle during operation, somewhat in the start region, exceeds a predetermined power level.

In accordance with an especially advantageous feature of the present invention, the control is performed in dependence upon the loading of the coupling device or coupling parts between the individual vehicles or vehicles and the load. In this embodiment of the invention, the coupling forces which arise between the individual vehicles or loads which change upon driving situations are taken through the working load for control, so that the desired synchronism of the individual vehicles or their cooperation in a special way is guaranteed.

The sensors for sensing the loading of the coupling parts between the vehicles or the load and the vehicles can be formed as mechanical, pneumatic, hydraulic, electric or electronic transducers or a combination of the above mentioned transducers, whose output values depend upon their mechanical loading. Particularly so-called wire strain gauge can be used as sensors, which are known from material and strength research. Thereby the pressing and pulling loads of the parts connected with the transducers or wire strain gauges can be directly registered and without structural changes and evaluated from the drive control.

It is to be understood that the coupling parts or the like can be coupled with pressure receivers other than sensors. For example, anchoring of the coupling members on the vehicles can be combined with pressure cells which produce a load-dependent signal. Moreover, elastic coupling members, for example springs, can be used, and the additional drive is controlled in dependence upon the spring stroke of the coupling member.

Advantageously, the power of the additional drive is controlled in dependence upon the travel direction, so that axles or wheel groups at an outer side and at an inner side of a curved path are supplied with different power. Thereby in certain situations a considerable improvement of the maneuverability is obtained, particularly when because of the parallel arrangement of the individual vehicles a vehicle compound has a considerable total width.

For obtaining input data for controlling the additional drive, in dependence upon the respective radius of curvature, the angular deflection of the coupling members or a turning deflection of individual wheels or of the vehicle combination can be sensed.

The control device can directly control the power of the additional drive, so that for example the quantity of fuel supplied to an internal combustion engine is changed.

Instead of this, the energy transmission between the motor of the additional drive and the respective driven axles or wheels can be influenced by controlling the transmission ratio and the like. In this case the power of the motor or motors of the additional drive is influenced indirectly, when the motor or motors tend to maintain constant a predetermined parameter, for example the rotary speed, the pressure of the driven hydraulic pumps, the voltage of the driven generators, etc.

The control for example influences the power of the additional drive as well as the energy transmission simultaneously and directly.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a lateral view of a heavy-duty vehicle system in accordance with the present invention;

FIG. 2 is a partial plan view of the vehicle system of FIG. 1;

DESCRIPTION OF A PREFERRED EMBODIMENT

Figure 3:
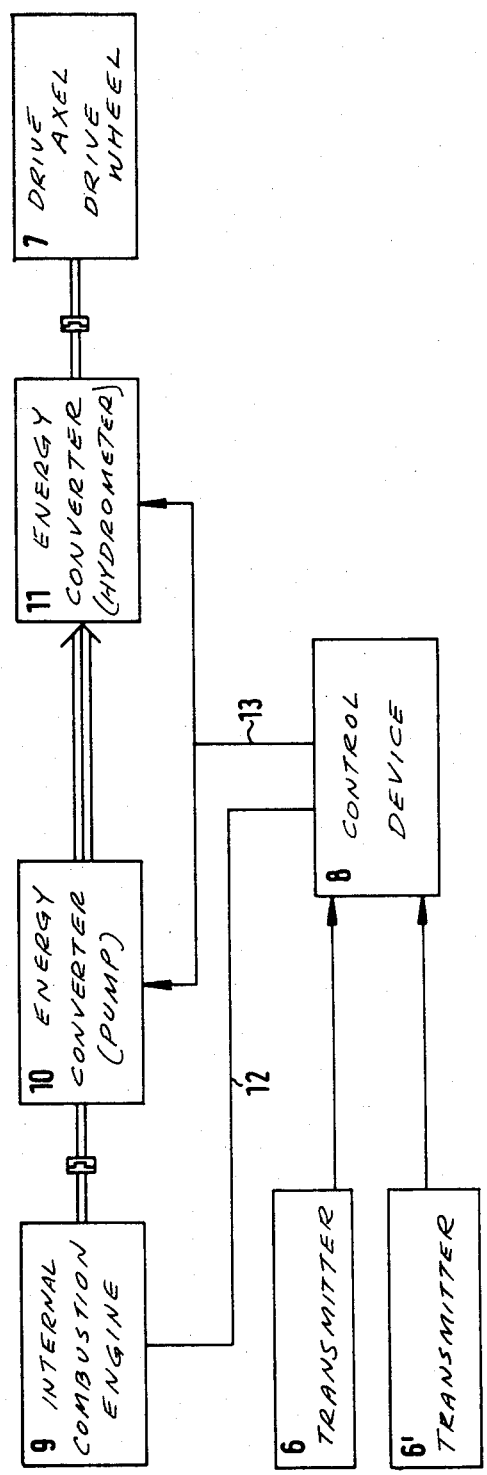
FIG. 3 is a block diagram of a control of the inventive vehicle system.

FIG. 1 shows a tractor 1 with a ballast load 2 and flat bed vehicles 3 and 3' with a working load 4 supported at their front or rear ends.

The flat bed vehicle 3 and the tractor 1 are connected with one another by a towing bar 5. The flat bed vehicles 3 and 3' move at a distance one behind the other and are mechanically connected with one another via the working load 4. The whole vehicle train has a plurality of driven axles or wheels 7. The drive of the wheels 7 of the tractor 1 is carried out by its motor. The drive of the wheels 7 of the flat bed vehicles 3 and 3' is carried out from an internal combustion engine 9, particularly a diesel engine, and a hydraulic pump 10 together forming a drive unit. This drive unit is connected by not shown hydraulic conduits with hydromotors arranged on the axles of the driven wheels 7 of the flat bed vehicles 3 and 3'. The drive unit 9, 10 which is separable from the flat bed vehicles 3, can if necessary be combined in a different way with the shown vehicles or other vehicles.

Control of the drive aggregate 9, 10 of the additional drive is executed by a not shown automatic control device in dependence upon a signal produced by a transducer device 6 on the towing bar 5. The transducer device 6 is connected, for example, with springy members of the towing bar 5 so as to measure a data proportional to the loading of the towing bar 5.

These data can use, for example, the resistance of an electric potentiometer which is displaced by a springy member of the towing bar in dependence upon the loading.

The control device can include a computer which, in dependence upon the respective input data produces output signals controlling a control member which further controls the internal combustion engine 9.

A vehicle shown in FIG. 2 has two flat bed vehicles 3 with working loads 4 at their front and rear end arranged parallel to one another. The working load is transmitted via a traverse 15 with a rotary plate uniformly on both vehicles 3.

The drive unit 9, 10 for the original drive of the flat bed vehicle 3 is here arranged on the tractor 1, and the energy transmission on the drive wheels of the flat bed vehicles 3 takes place via not shown hydraulic conduits.

The transducer device 6 includes wire strain guages arranged on the towing bar 5, which in turn is arranged by a yoke tranverse on the flat bed vehicles 3. The wire strain gauges have an electrical resistance which depends on their mechanical strain, and because of their arrangement on the towing rods of the towing bar 5 are subjected to longitudinal deformations when the towing rods of the towing bar 5 are expanded or bulged after loading.

A further transducer device 6' can be provided in some cases which supplies signals depending on the angle between the towing bar 6 and the longitudinal axis of the flat bed vehicle 3. This can be carried out in order to drive in some cases the wheels on the outer curve relative to the wheels on the inner curve of the flat bed vehicle during driving along a curve with different speeds or efficiencies, so that the maneuverability of the vehicle is improved.

The block diagram of FIG. 3 shows the internal combustion engine 9 and the hydraulic pump 10 which is mechanically connected with the internal combustion engine and can be, for example, a hydrostatic pump. The hydraulic pump 10 together with the motor 9 form the drive unit of one or several vehicles of a vehicle combination. The hydraulic pump 10 is connected via hydraulic conduits with, advantageously, hydrostatic motors 11 which in their turn are mechanically connected with the driven wheels 7.

An electronic control device 8 influences via control conduits 12 and not shown control elements the output of the motor 9, and via a control conduit 13 and the control element the energy transmission from the motor 9 to the driven wheels 7, so that different working steps of the hydraulic pump 10 and the hydraulic motors 11 are actuated.

This control is performed in dependence upon the input signals obtained from the transducer devices 6 or 6', which react to different working conditions of for example loading of a towing bar, the curve radius, etc. In contrast to the embodiment of FIG. 3, only the control conduit 12 or only the control conduit 13 can be provided, so that the control device controls only the output of the motor 9 or only the working condition of the energy transmission, or in other words the energy of the hydropump 10 and the hydromotors 11. During control of the output of the motor 9, the control of the pump 10 and the hydromotors 11 can be carried out indirectly, by switching on their displacement steps in dependence upon the rpm of the motor. During control of the pump 10 and the hydromotors 11, the output of the motor 9 can also be indirectly adjusted by the control device 8, so that the motor 9 can attain a constant rpm, a predetermined hydraulic pressure, etc.

Instead of a hydraulic energy transmission from the motor to the driven wheel 7, electric energy transmission can also be provided. In this case, insted of the hydraulic pump 10 a generator, and instead of the hydraulic motor 11 electric motors connected with the generator, are provided.

Figure 4:
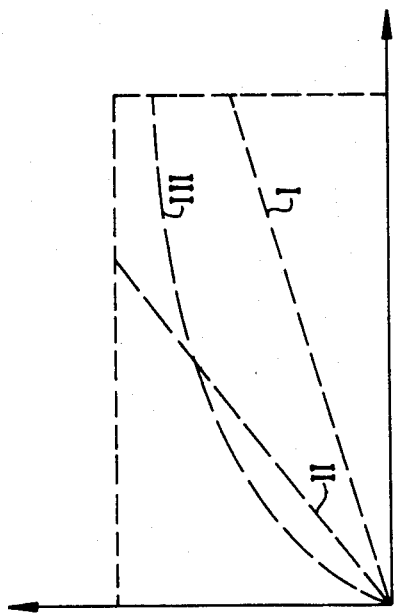
FIG. 4 is a graphic representation of the dependence between the power of an additional drive from the respective power of a tractor or a leading vehicle.

FIG. 4 shows that between the output (power) of the drive of the tractor 1 and the output (power) of the drive unit for the additional drive of the vehicle 3, different ratios can be provided. The straight lines I and II show the possibility that the output of the additional drive increases in a different manner linearly with the output of the motor. The curve III shows the possibility that a non-linear relation between the output of the tractor and the output of the additional drive can be established, the output of the additional drive in the shown example relatively strongly increasing in the region of the small outputs.

The invention is not limited to the shown embodiments. For example, the flat bed vehicles 3 and 3' shown in FIG. 3 can be used in some cases without the tractor 1 as a self-propelled vehicle. In this case, the drive power supplied to the flat bed vehicle 3' can be controlled, for example, in dependence upon the pulling and pressing forces acting upon the support of the working load 4 in the longitudinal direction of the vehicle.

A respective control of the drive output of the flat bed vehicle 3' is naturally also possible when a tractor is utilized as shown in FIG. 1.

It will be understood that each of the elements described above, or two or more together, may also find a useful application in other types of constructions differing from the types described above.

While the invention has been illustrated and described as embodied in a heavy-duty vehicle system, it is not intended to be limited to the details shown, since various modifications and structural changes may be made without departing in any way from the spirit of the present invention, for example the leading vehicle may be arranged at the rear end of the vehicle system or compound; and on principle every vehicle of the system or compound may be arranged as the leading vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and described to be protected by Letters Patent is set forth in the appended claims:

1. A heavy-duty vehicle system, comprising a driving vehicle having a main drive; a plurality of driven multi-axle vehicles connected with one another and arranged so that at least some of them have an additional drive, said vehicles being releasably connected with one another via load-supporting elements and/or supported loads; sensing means arranged to sense travel conditions; and self-acting automatic computer control means connected with said sensing means and arranged to control said additional drives of said driven vehicles in correspondence with said driving vehicle and in dependence upon the travel conditions sensed by said sensing means.

2. A heavy-duty vehicle system as defined in claim 1, wherein said sensing means includes a plurality of sensors connected with said control means.

3. A heavy-duty vehicle system as defined in claim 1, wherein said vehicles include vehicles which carry loads and are provided with a plurality of at least partially driven supporting roller elements.

4. A heavy-duty vehicle system as defined in claim 1, wherein said vehicles are provided with a plurality of supporting roller elements formed as turnable axles.

5. A heavy-duty vehicle system as defined in claim 1, wherein said vehicles are provided with a plurality of supporting roller elements formed as turnable wheels.

6. A heavy-duty vehicle system as defined in claim 1, wherein said driving vehicle has a motor, said driven vehicles having a plurality of supporting roller elements provides with individual drive elements which are driven by said additional drives, and said additional drives of said driven vehicles being formed as separate drive units independent of said motor of said driving vehicle.

7. A heavy-duty vehicle system as defined in claim 6, wherein said drive elements of said supporting roller elements of said driven vehicles are formed as hydraulic drive elements.

8. A heavy-duty vehicle system as defined in claim 6, wherein said drive elements of said supporting roller elements of said driven vehicles are electric drive elements.

9. A heavy-duty vehicle system as defined in claim 6, wherein said drive units of said driven vehicles are formed as diesel generator units.

10. A heavy-duty vehicle system as defined in claim 6, wherein said drive units of said driven vehicles are formed as diesel-hydropump units.

11. A heavy-duty vehicle system as defined in claim 6, wherein said drive units of said driven vehicles are formed so as to be coupled with different vehicles.

12. A heavy-duty vehicle system as defined in claim 6, wherein said drive units of said driven vehicles are formed so that they are separable from the respective vehicle.

13. A heavy-duty vehicle system as defined in claim 1, wherein said sensing means includes a plurality of sensors arranged to sense different data, said control means being adjustable to different data sensed by said sensors.

14. A heavy-duty vehicle system as defined in claim 1, wherein said sensing means includes a plurality of different sensors arranged to sense different data, said control means being adjustable to different data sensed by said different sensors.

15. A heavy-duty vehicle system as defined in claim 1, wherein said main drive of said driving vehicle includes a motor, said control means controlling said additional drives of said driven vehicles in dependence upon a momentary output of said motor of said main drive of said driving vehicle.

16. A heavy-duty vehicle system as defined in claim 1; and further comprising coupling means arranged to connect said driving vehicle with said driven vehicles, said control means being arranged to react to loading of said coupling means.

17. A heavy-duty vehicle system as defined in claim 16, wherein said sensing means includes sensors arranged to sense the loading of said coupling means and formed as transducer whose input values depend on their mechanical strain.

18. A heavy-duty vehicle system as defined in claim 1; and further comprising a further coupling means arranged to connect said driven vehicles with one another, said control means being arranged to react to loading of said further coupling means.

19. A heavy-duty vehicle system as defined in claim 1, wherein said driven vehicles are a plurality of supporting roller elements, said control means being arranged so that during travel of said driven vehicles along a curved path they drive differently outwardly travelling roller elements and inwardly travelling roller elements in direction of supporting the travel along the curved path.

20. A heavy-duty vehicle system as defined in claim 19; and further comprising coupling means connecting said vehicles with one another, said sensing means being arranged to sense an angular deflection of said coupling means.

21. A heavy-duty vehicle system as defined in claim 19, wherein said sensing means is arranged to sense turning of individual roller elements.

22. A heavy-duty vehicle system as defined in claim 1, wherein said additional drives of said driven vehicles have a motor, said control means being arranged to control an output of said motor of said additional drives.

23. A heavy-duty vehicle system as defined in claim 1, wherein said driven vehicles have driven supporting roller elements, said additional drives of said driven vehicles having a motor, said control means being arranged to control energy transmission between said motor of said additional drives and said driven roller elements.

24. A heavy-duty vehicle system as defined in claim 1, wherein said driven vehicles are connected with one another by load-supporting elements.

25. A heavy-duty vehicle system as defined in claim 1, wherein said driven vehicles are arranged so that they are connected with one another via a load to be transported on them.

26. A heavy-duty vehicle system as defined in claim 1, wherein said driven vehicles are connected with one another by coupling means, said sensing means being arranged for sensing the loading of said coupling means.

27. A heavy-duty vehicle system as defined in claim 1; and further comprising coupling means for connecting said driven vehicles with a load, said sensing means being arranged to sense the loading of said coupling means.

28. A heavy-duty vehicle system as defined in claim 1, wherein said sensing means are arranged to sense an instantaneous output of said additional drives of said driven vehicles.

29. A heavy-duty vehicle system as defined in claim 1; and further comprising coupling means provided between said driven vehicles, said sensing means being arranged to sense angular positions of said coupling means.

30. A heavy-duty vehicle system as defined in claim 1, wherein each of said driven vehicles has drive means connected with a separately mountable drive aggregate.

31. A heavy-duty vehicle system as defined in claim 1, wherein said sensing means is arranged to sense the output of the main drive of said driving vehicle.

* * * * *